L. D. OAKES.
CURD CUTTING MACHINE.
APPLICATION FILED MAR. 25, 1910.
966,587.
Patented Aug. 9, 1910.
2 SHEETS—SHEET 1.
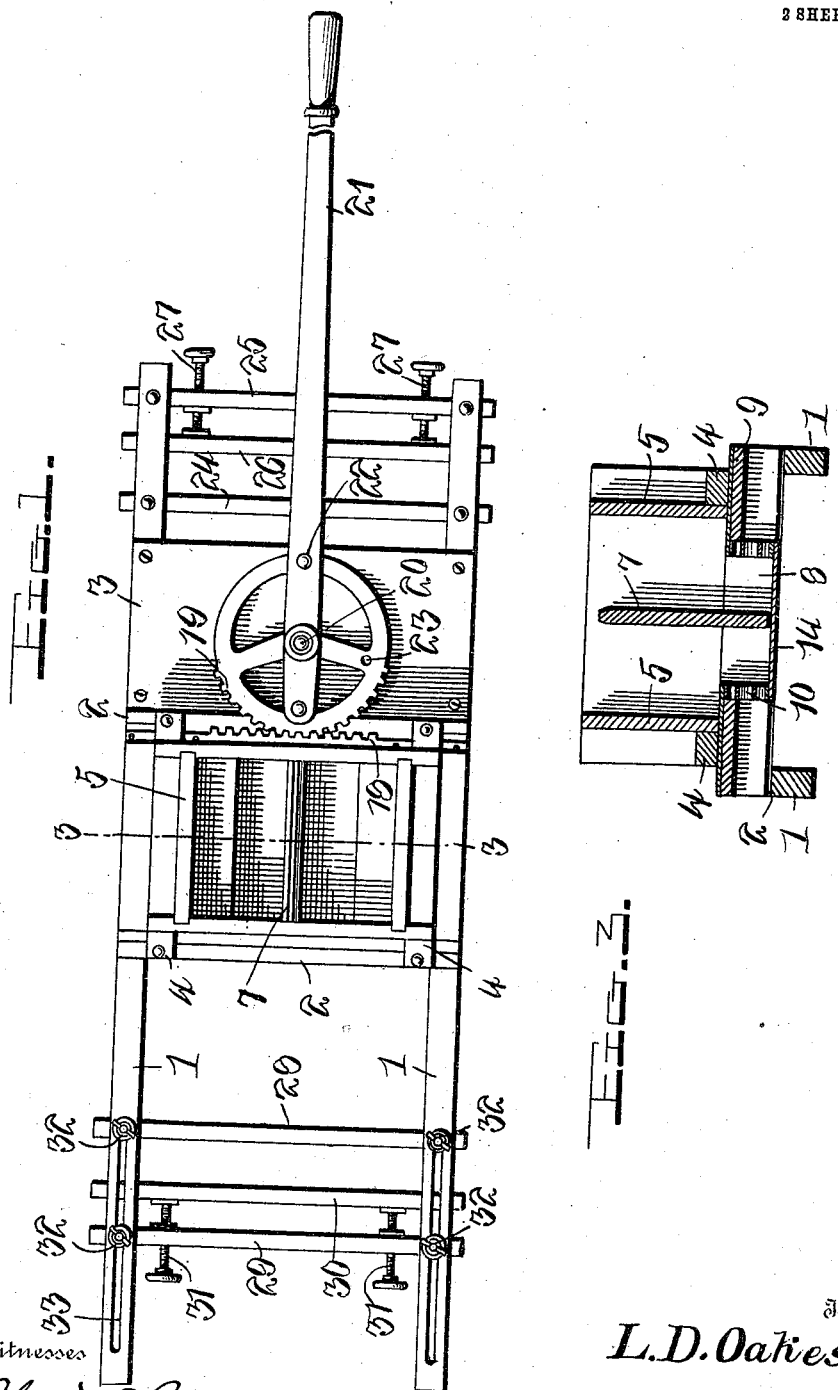
Witnesses
Chas. L. Griesbauer.
E. M. Ricketts
Inventor
L. D. Oakes,
By Watson E. Coleman
Attorney

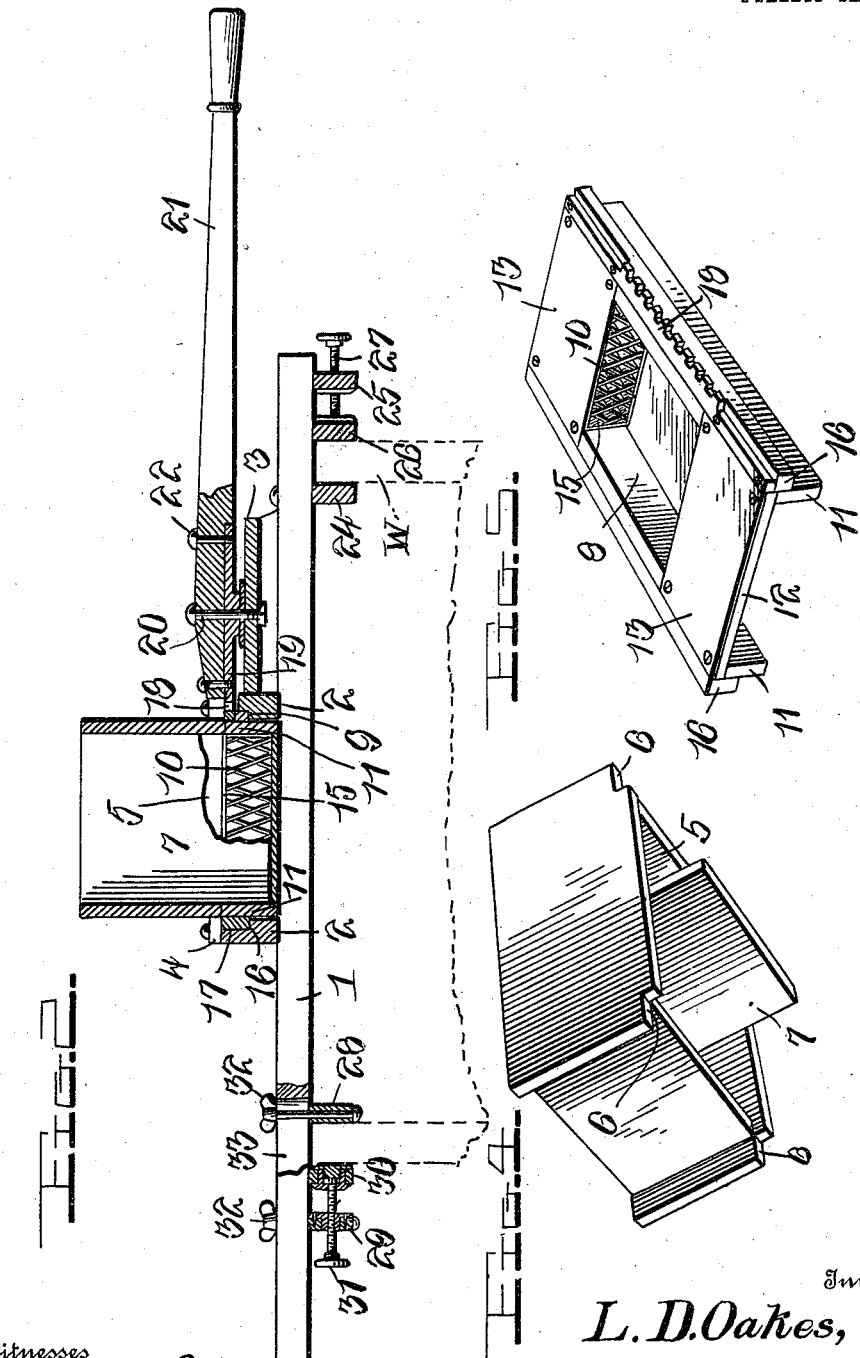

UNITED STATES PATENT OFFICE.

LESTER D. OAKES, OF WATERTOWN, NEW YORK.

CURD-CUTTING MACHINE.

966,587.  Specification of Letters Patent.  Patented Aug. 9, 1910.

Application filed March 25, 1910. Serial No. 551,507.

*To all whom it may concern:*

Be it known that I, LESTER D. OAKES, a citizen of the United States, residing at Watertown, in the county of Jefferson and State of New York, have invented certain new and useful Improvements in Curd-Cutting Machines, of which the following is a specification, reference being had to the accompanying drawings.

My invention relates to improvements in curd cutting machines or mills.

The object of the invention is to provide a machine of this character which will be simple and practical, which may be easily operated by hand power, and which will be exceedingly rapid and efficient in use.

With the above and other objects in view, the invention consists of the novel construction, combination and arrangement of parts, hereinafter fully described and claimed, and illustrated in the accompanying drawings in which:—

Figure 1 is a plan view of my improved curd cutting machine; Fig. 2 is a vertical, longitudinal section through the same, the walls of the vat or tank being indicated in dotted lines; Fig. 3 is a vertical cross section taken on the plane indicated by the line 3—3 in Fig. 1; Fig. 4 is a perspective view of the hopper; and Fig. 5 is a perspective view of the slide.

The machine or mill is adapted to be clamped on the top of a vat or tank and comprises a body portion or frame consisting preferably of parallel side bars 1 connected intermediate their ends by spaced parallel cross bars 2, and a transverse board or plate 3. The cross bars 2 are united by short longitudinal connecting bars 4 arranged on their upper edges adjacent their ends, and on which is removably supported a hopper 5 into which the curd to be cut is placed. This hopper is in the form of a rectangular box disposed transversely on the frame and consisting of end members uniting side members, which latter have their lower edges notched at their extremities as shown at 6, to receive the supporting bars 4.

Arranged centrally within the hopper is a rigidly mounted upright partition 7, the lower end of which projects beyond the bottom edges of the side members of the hopper box, and into a curd receiving chamber 8 formed in a slide 9 mounted for reciprocatory movement beneath the hopper and between the cross bars 2. The notched or shouldered portions 6 of the hopper prevent longitudinal shifting of the same, while the depending end of the partition 7 prevents lateral or transverse movement of the hopper. Said partition 7 also serves as a stationary abutment, against the opposing sides of which work two curd cutting members or knives 10 arranged at opposite ends of the chamber 8 in the slide, it being noted on reference to Fig. 3 that said slide forms a movable bottom for the hopper, and owing to the reciprocatory movement of the slide said chamber 8 is adapted to be brought alternately into communication with the two chambers or compartments formed in the hopper by the partition 7. The slide 9 is preferably constructed of two parallel side members or bars 11 united adjacent their ends by transverse plates or boards 12 secured to their upper edges and preferably covered with metal plates or sheets 13.

The compartment 8 is centrally arranged in the slide and of rectangular shape, and its side walls formed by the intermediate portions of the bars 11, its ends formed by the knives 10 and its bottom formed by a plate or board 14 secured centrally on the bottom edges of the bars 11 and extending from one knife to the other. The knives or cutters 10 may be of any form and construction but as illustrated they are composed of diagonally arranged, intersecting sheet metal strips arranged within a rectangular metal frame 15, as shown more clearly in Fig. 5. Formed on or secured to the outer faces of the longitudinal or side bars 11 of the slide, are ribs 16 which slide in guide grooves 17 formed in the opposing faces of the cross bars 2, whereby the slide is supported and guided in its reciprocatory movement.

While I may provide any means for reciprocating the slide, I preferably place on one side of the latter a longitudinal rack 18 with which meshes a gear segment 19 mounted on a vertical pivot 20 arranged on the plate or support 3. Secured to this gear segment is a hand lever 21, which when oscillated causes the slide to reciprocate. The lever 21 preferably extends from one end of the device and is bolted to the gear segment by the pivot bolt 20 and one or more additional bolts 22, but if desired the lever may be arranged to project from one side of the device by passing one of the bolts or fastenings 22 through an opening 23 formed in the gear segment, as will be understood on reference to Figs. 1 and 2.

Any suitable means may be provided for mounting the machine on a vat or the like, but I preferably arrange on the side or longitudinal bars 1 of the body two clamping devices to engage the walls W of the vat. The clamp at one end of the device comprises two stationary cross bars 24, 25, and an adjustable cross bar 26, between which latter and the bar 24 the wall W is disposed. The adjustable or clamping bar 26 is swiveled on two clamping screws 27 which extend through nuts fixed to the bar 25.

The clamping device at the opposite ends of the bars 1 is adjustable longitudinally of the latter to adapt the device for application to different size vats. This adjustable clamping device is similar in construction to the one just described and comprises relatively stationary cross bars 28, 29, and an adjustable, clamping cross bar 30 which is swiveled to screws 31 on the bar 29, as clearly shown in Fig. 2. To permit of the longitudinal adjustment of the clamp the relatively stationary bars 28, 29, carry vertically disposed clamping bolts 32 which pass through and are slidable in longitudinal slots 33 formed in the bars 1, see Fig. 1.

In operation when the parts are assembled as shown in Figs. 1 and 2, and the device is clamped on the vat W, the curd is placed in the hopper and the lever 21 is reciprocated. When said lever swings in one direction the knife 10 at one end of the slide 9 forces the curd in the compartment or chamber 8 against the abutment formed by the lower end of the partition 7 so that the curd will be squeezed through the openings in the knife or cutter 10 and will be cut into diamond-shaped pieces. On the return stroke of the lever the knife 10 at the opposite end of the compartment 8 will cut the curd on the opposite side of the abutment or partition 7, thus making the cutting operation continuous and rendering the machine of large capacity. Owing to the simple construction of the machine, it may be produced at a small cost, will be strong and durable, and its parts may be readily separated for cleaning or repairs. I have found in practice that the machine is not only rapid in operation, but will effectively cut the curd with comparatively little effort or labor on the part of the user.

While I have shown and described in detail the preferred embodiments of the invention, it will be understood that I do not wish to be limited to the precise construction set forth, since various changes in the form, proportion and arrangement of parts, and in the details of construction, may be resorted to within the spirit and scope of the invention.

Having thus described the invention, what is claimed is:

1. A machine of the character described comprising a support to extend across the top of a vat, transverse guide bars on said support, connecting and supporting bars uniting said guide bars, a reciprocatory slide engaged with said guides and having at its center a compartment, curd cutting knives forming opposite walls for said compartment and a removable hopper having shouldered portions to engage said connecting and supporting bar, and a partition provided with a depending end to enter the compartment in the slide and form an abutment against which said knives operate, and means for reciprocating the slide.

2. A machine of the character described comprising a support to extend across the top of a vat, clamping devices adjacent the opposite ends of the support for engagement with the walls of the vat, one of said clamping devices being longitudinally adjustable on the support, a reciprocatory slide on the support and having a compartment provided in its opposite walls with curd cutting knives, a hopper disposed above the slide, a stationary abutment to extend into the compartment of the slide and against which said knives operate, and means for reciprocating the slide.

In testimony whereof I hereunto affix my signature in the presence of two witnesses.

LESTER D. OAKES.

Witnesses:
 CLARENCE S. CRABB,
 HAYDON L. CANFIELD.